INVENTORS.
FRANKLIN R. POTTER AND
WILLIAM H. TINGLE
BY Robert T. Teeter
ATTORNEY

3,245,306
PHOTOMETER AND METHOD
Franklin R. Potter, New Kensington, and William H. Tingle, Lower Burrell, Pa., assignors to Aluminum Company of America, Pittsburgh, Pa., a corporation of Pennsylvania
Filed Oct. 5, 1961, Ser. No. 143,160
3 Claims. (Cl. 88—14)

This invention relates to a photometer and method for determining image reflectivity of surfaces, particularly distinctness of reflected image gloss of relatively smooth, metallic surfaces or bloom of such surfaces. It is especially suitable for the determination of image clarity of polished or bright dipped aluminum, with or without an anodic oxide coating. While complex goniophotometer instruments are available for measuring the angular distribution of light reflected from a surface, there has been need for an abridged goniophotometer instrument and method of testing surfaces for image reflectivity not requiring a complex and difficultly adjusted optical system to measure small angle scatter of reflected light.

It is an object of the invention to provide for measuring image reflectivity of surfaces, particularly on a basis correlating well with the resolving power of the human eye. A particular object is the provision of a photometer and method of use that permits rapid and simple instrument alignment with successive surfaces to be tested.

The invention will be described with reference to the embodiment thereof shown in the accompanying drawing in which.

Figure 1:
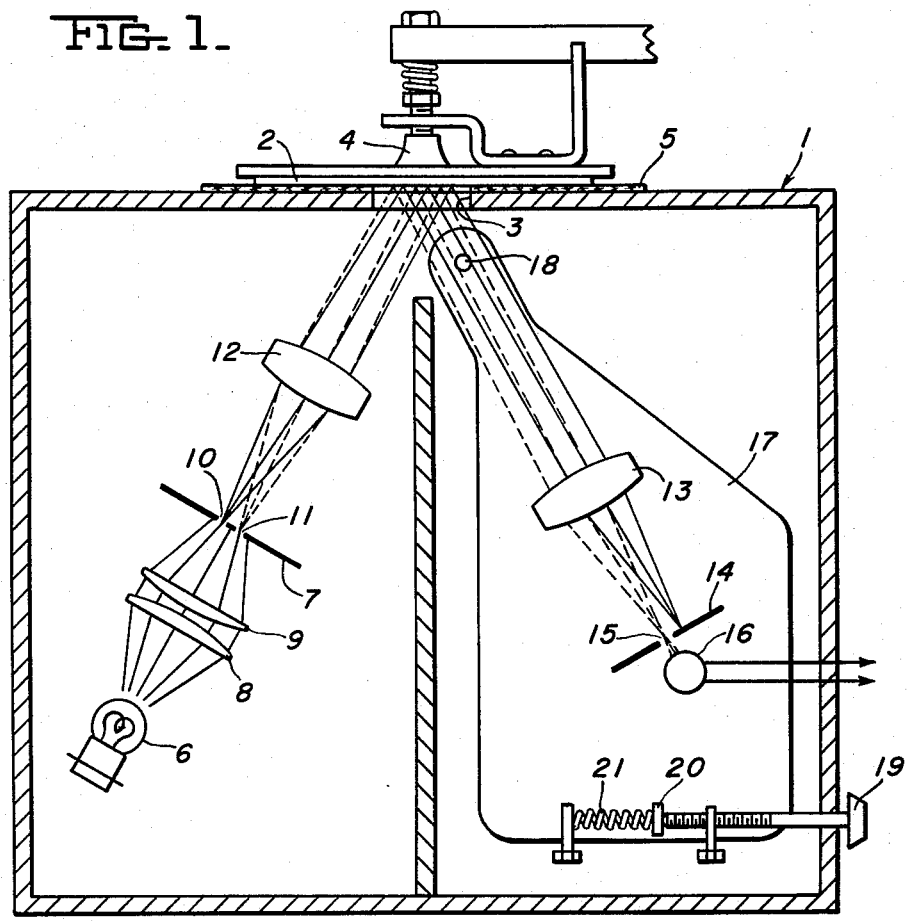
FIGURE 1 shows a schematic arrangement of the instrument.
Figure 2:
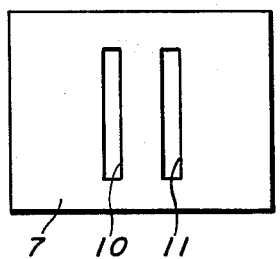
FIGURE 2 shows the primary mask with two slits, on an enlarged scale.
Figure 3:
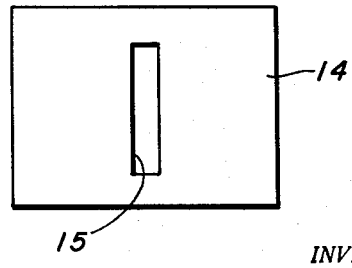
FIGURE 3 shows the secondary mask with one slit, on a similarly enlarged scale.

Referring to the drawing, the instrument comprises a cabinet 1, on one wall of which a sample 2 may be held, with its surface to be tested exposed at an aperture 3. The sample may be held in place, and in a flat condition, by a suitable clamp 4 which presses the sample against felt pad 5, this arrangement providing a convenient sample mount for presenting a surface of the sample for test.

Light source 6 illuminates a primary mask 7, and a pair of condensing lenses such as 8 and 9 may be employed if desired to gather more of the light from the light source 6 and direct it toward the mask 7. The mask 7 has two adjacent preferably identical and parallel slits 10 and 11, which are illuminated by the single light source. They may conveniently be about 150 microns wide and about 1" long. The adjacent edges of slits 10 and 11 may be about 300 microns apart, the significance of their spacing being hereinafter explained. As shown in this embodiment, a collimating lens 12, located so that its focal point is at the mask 7, projects images of the two slits in the primary mask on the test surface of sample 2 at the aperture 3. The images are thus projected, preferably in a substantially parallel manner, at an angle from the normal to the test surface, which angle is not critical and may conveniently be on the order of 30° when buffed or bright dipped aluminum surfaces are to be evaluated. The collimating lens 12 need not be employed, however, if this is not desired.

The images as reflected by the test surface of the sample 2 are received by a focusing lens 13 and the secondary mask 14, which has a single slit 15. Lens 13 is located so its focal point is at the mask 14. The slit 15 in the secondary mask 14 is conveniently about 250 microns wide, and it may be approximately 1" long, i.e. secondary slit 15 is preferably wider than either of the primary slits 10 and 11 and slightly narrower than the spacing between the images as reflected from the test surface. The secondary mask with its slit is provided for receiving such images, the lens 13 focusing the reflected images upon the secondary mask. While the lens 13 is shown in the reflected light system, such a lens could optionally be placed in the incident light system. Beyond the secondary mask 14 is a light sensing means such as photocell 16 (or photomultiplier tube), which is electrically connected to a suitable meter (not shown) for receiving image light as reflected and passed through the slit 15.

The secondary mask 14 and, preferably, both photocell 16 and lens 13, are mounted on a platform 17 which is angularly movable, conveniently about a pivot 18 near the sample mount and aperture 3. Thus the secondary mask 14 is movable to scan across the angle subtended by the reflected images. This movement and adjustment of position of the secondary mark 14 is conveniently provided for by way of adjusting screw 19, lug 20 affixed to platform 17 and spring 21. The maximum light intensities at each mid-image position, and the minimum light intensity between the two images, as received by photocell 16, are easily determined by observing the meter response as the scanning screw 19 is turned. Repositioning of successive samples is easily obtained by pressing them against the sample mount at aperture 3, but exacting positioning of any particular sample is not necessary. Curved or warped samples may be pressed and held in a flattened position by clamp 4.

Where distinctness of reflected image on a basis most nearly corresponding to that which may be resolved by the human eye is desired, the spacing between primary slits 10 and 11 can be made narrow enough that their reflected images at the secondary mask subtend and angle of reflection as low as 4 minutes (the half angle between the midpoint of either image and the midpoint between the two images thus being about 2 minutes, i.e. about the smallest angle at which lack of clarity in a near-perfect mirror can be detected by the human eye). A subtended angle between images of 16 minutes has proven quite adequate for image clarity measurement on aluminum, however. This latter arrangement provides for measuring light scattered at an angle of 8 minutes from the specular reflecting angle. Larger angles may be chosen, particularly when evaluation of bloom of surfaces is desired, reflectance measurements for bloom evaluation usually being measured at an angle of about 2 degrees from the specular reflecting angle. In such case, the subtended angle between the two images would be about 4 degrees, but subtended angles up to those on the order of 8 degrees may be advantageously used, if desired.

The instrument as described may be conveniently used for determining the clarity of images reflected by a test surface. Light from the source 6 passes through the primary slits 10 and 11 and is projected to and reflected by the test surface of sample 2 as two images (of the two primary slits), focused on the plane of the secondary mask 14 with its scanning slit 15. That part of the light which passes through the scanning slit 15 falls on the photocell 16, and the photometer to which it is connected indicates the intensity of the light passing thereto. For a good mirror in the sample position little light is scattered between the images. The intensity of each image will be the same when the midpoint of the scanning slit is at the midpoint of either image. The intensity of the light passed by the scanning slit and received by the photocell will be found to be at a minimum, if not practically at zero, when the midpoint of the scanning slit is half way between these two images, e.g. 8 minutes of arc from either when the images are 16 minutes apart.

Various imperfect-mirror sample surfaces to be tested will indicate various relationships between minimum and maximum light intensities determined when the reflected images are scanned. All that need be determined is the minimum light intensity between images and the maximum at either. A convenient measure of image clarity is the ratio of the minimum light intensity to the maximum. Gain changes in the photocell-meter system from time to time, or differences in total reflectivity of surfaces tested, become unimportant when such a ratio is determined. Determining the relationship of minimum to maximum light intensities passing the secondary slit of the instrument herein described provides a measure of image clarity not influenced by surface brightness. A polished black glass mirror may have the same image clarity as a silvered or aluminized mirror, even though the total and specular reflectance of the one is only a few percent of that of the other. In othe words, the sharpness and definition or distinctness of image reflected by a polished black glass mirror may be equivalent to that reflected by a silvered or aluminized mirror, and this may be determined by the instrument described. Further, with the photometer herein described there is no need to determine the exact difference in angular position between a maximum reading and the minimum reading, since the angularity relied upon is established by the instrument readings themselves. With a conventional goniophotometer, comparable data would require exacting reading of the angular locations (in a few minutes of arc) at which instrument readings were obtained. This exacting chore is avoided by use of the instrument herein described.

Numerous modifications in the instrument and method described will occur to those skilled in the art. It will be seen that an instrument and method has been developed that can obviate use of either complex instruments or more subjective visual techniques for determination of image reflectivity of surfaces.

What is claimed is:
1. A photometer for determining image reflectivity of surfaces comprising
   a sample mount for presenting a surface for test,
   a light source and primary mask with two adjacent slits for passing light and thereby projecting images of said slits on the test surface,
   a light sensing means and secondary mask with a slit for receiving said images as reflected from the test surface,
   a lens for focusing said images upon said secondary mask, and
   means for moving said secondary mask to scan across said reflected images,
   whereby the maximum light intensity of either of the reflected images and also the minimum light intensity between the two reflected images may be determined by said light sensing means, the relationship of the latter to the former providing a measure of image reflectivity.
2. An instrument according to claim 1 in which
   a collimating lens is employed for substantially parallel projection of the images to the test surface, and
   the slit in said secondary mask is both wider than either of the slits in said primary mask and narrower than the spacing between reflected images received at the secondary mask.
3. An instrument according to claim 1 in which the slits in said primary mask are substantially identical, parallel, and so spaced that their reflected images at the secondary mask subtend an angle of reflection on the order of 4 minutes to 8 degrees.

References Cited by the Examiner

UNITED STATES PATENTS

| 2,253,054 | 8/1941 | Tuttle et al. | 88—14 |
| 2,446,628 | 8/1948 | Brown | 88—14 |
| 2,630,736 | 3/1953 | Beitz. | |

FOREIGN PATENTS 466,114   6/1950   Canada.

OTHER REFERENCES

Tuttle et al.: A Method for the Measurement of Flatness of Polished Surfaces, J.O.S.A., vol. 30, No. 8, August 1940, pages 348–350.

JEWELL H. PEDERSEN, *Primary Examiner.*